US012812385B2

(12) United States Patent
Wheat et al.

(10) Patent No.: US 12,812,385 B2
(45) Date of Patent: Nov. 24, 2026

(54) UE SELF-INITIATED VERIFICATION OF SIM PRESENCE

(71) Applicant: T-Mobile USA, Inc., Bellevue, WA (US)

(72) Inventors: William Wheat, Greenbank, WA (US); Rahul Raj, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 18 days.

(21) Appl. No.: 18/789,661

(22) Filed: Jul. 30, 2024

(65) Prior Publication Data

US 2026/0040082 A1 Feb. 5, 2026

(51) Int. Cl.
*H04W 12/72* (2021.01)
*H04W 8/18* (2009.01)
*H04W 12/06* (2021.01)
*H04W 12/77* (2021.01)

(52) U.S. Cl.
CPC ............. *H04W 12/72* (2021.01); *H04W 8/18* (2013.01); *H04W 12/06* (2013.01); *H04W 12/77* (2021.01)

(58) Field of Classification Search
CPC ....... H04W 12/72; H04W 8/18; H04W 12/06; H04W 12/77
See application file for complete search history.

(56) References Cited

U.S. PATENT DOCUMENTS

| | | | | |
|---|---|---|---|---|
| 8,036,705 | B2 * | 10/2011 | Jang ........................ | H04W 8/18 713/168 |
| 10,390,226 | B1 * | 8/2019 | Cheung ............... | H04L 63/0853 |
| 11,184,356 | B1 | 11/2021 | Tandon et al. | |
| 11,516,676 | B1 * | 11/2022 | Holmes ................. | H04W 12/72 |
| 12,707,242 | B2 | 8/2026 | Raleigh et al. | |
| 2004/0043791 | A1 | 3/2004 | Reddy | |

(Continued)

FOREIGN PATENT DOCUMENTS

| | | | |
|---|---|---|---|
| CA | 2912066 | A1 | 5/2016 |
| WO | 2020220840 | A1 | 11/2020 |
| WO | 2021091739 | A1 | 5/2021 |

OTHER PUBLICATIONS

International Search Report and Written Opinion received in International Application No. PCT/US2025/035560 mailed on Oct. 8, 2025, 12 pages.

(Continued)

*Primary Examiner* — Michael Won
(74) *Attorney, Agent, or Firm* — Foley IP Law, PLLC

(57) ABSTRACT

Verification of a subscriber identity module (SIM), without requiring that the SIM be removed from a user equipment (UE, e.g., a cellphone), is provided in a UE self-initiated process. The UE scans a code (e.g., a QR code posted in a retail facility), or opens an app, to visit a verification website. The UE sends its IP address and/or the identifier (ID) of the SIM inside. If the verification website determines that the IP address of the UE or the SIM ID has a match in a SIM address list, which associates UE IP address and SIM IDs (e.g., integrated circuit card identifiers, ICCIDs), the UE is provided with a time-sensitive scannable code (e.g., QR code) that indicates the UE's SIM is verified. An employee of the wireless carrier scans the code with a terminal to identify the verification and grant access to make changes to the associated user account.

17 Claims, 8 Drawing Sheets

(56) References Cited

U.S. PATENT DOCUMENTS

2007/0055873 A1 3/2007 Leone et al.
2008/0113651 A1* 5/2008 Choi ........................ H04M 1/66 455/411
2010/0202351 A1* 8/2010 Xi ........................ H04L 61/4588 370/328
2013/0185210 A1* 7/2013 Dodson .................. G06Q 20/40 705/44
2014/0040628 A1 2/2014 Fort et al.
2014/0059343 A1 2/2014 Mohajeri et al.
2014/0112551 A1 4/2014 Terwilliger
2014/0173282 A1* 6/2014 Pascariello ............. H04L 63/08 713/171
2014/0289508 A1* 9/2014 Wang .................. H04L 63/0853 726/4
2015/0128230 A1* 5/2015 Chang ................... H04W 12/50 726/5
2015/0172288 A1 6/2015 Terwilliger
2016/0203352 A1 7/2016 Marsico
2016/0269181 A1 9/2016 Hon et al.
2017/0070527 A1* 3/2017 Bailey ................. G06F 16/9535
2018/0276651 A1 9/2018 Gauli et al.
2019/0026456 A1* 1/2019 Hon ........................ G06F 21/40
2019/0281454 A1 9/2019 Cheung
2020/0092272 A1* 3/2020 Eisen .................. H04L 63/0869
2020/0210988 A1 7/2020 Woodward et al.
2022/0014889 A1 1/2022 Ravichandran
2022/0217527 A1 7/2022 Naujok et al.
2024/0045639 A1 2/2024 Yang et al.
2024/0089249 A1 3/2024 Richardson et al.
2024/0323692 A1 9/2024 Parimi
2025/0184742 A1* 6/2025 Woodworth .......... H04W 12/06
2026/0046617 A1 2/2026 Wheat et al.

OTHER PUBLICATIONS

International Search Report and Written Opinion received in International Application No. PCT/US2025/035808 mailed on Sep. 23, 2025, 10 pages.
International Search Report and Written Opinion received in International Application No. PCT/US2025/035806 mailed on Oct. 13, 2022, 11 pages.
U.S. Appl. No. 18/764,086; Office Action dated Jan. 16, 2026; 10 pages.
Non-Final Office Action mailed on Mar. 25, 2026, in U.S. Appl. No. 18/799,977, 22 Pages.
Final Office Action issued in U.S. Appl. No. 18/764,086, mailed Aug. 17, 2026, 10 Pages.

* cited by examiner

UE SELF-INITIATED VERIFICATION OF SIM PRESENCE

BACKGROUND

Social engineering enables cyber attacks that permit bad actors to make changes on a victim's cellular service account. A one time PIN, sent to the victim's cellphone (e.g., in a text message) is used a proxy for verifying the identity of the person who purports to be the owner of the account. What is truly being verified in this arrangement, however, is the presence of the subscriber identity module (SIM), because the SIM can be moved around among different cellphones. It is the SIM that determines which cellphone (or user equipment, UE) that receives the one time PIN.

Unfortunately, a 2-actor man-in-the-middle attack is able to defeat a one time PIN identity verification scheme. One scenario uses the following ploy: The first actor enters a retail facility of the cellular service provider, pretending to be the victim, and initiates an action (e.g., a change of the victim's account with the organization, such as adding or removing certain services). The service provider transmits a one time PIN to the victim (e.g., by text message to the victim's cellphone) to use for the identity verification.

The second actor is in contact with the victim and tricks the victim into revealing the one time PIN, such as by pretending to be an employee of the service provider. Upon obtaining the one time PIN from the victim, the second actor covertly relays the one time PIN to the first actor, who provides it to a real employee of the service provider within the retail facility. The employee of the service provider is then misled into believing that the first actor is the victim.

As an alternative, the employee of the service provider may request that a threat actor display a screen on the cellphone that displays the integrated circuit card identification number (ICCID), which is an 18 to 22-digit unique serial number that identifies the SIM card. However, the threat actor could instead display a screenshot that was obtained from the victim by another ruse.

SUMMARY

The following summary is provided to illustrate examples disclosed herein, but is not meant to limit all examples to any particular configuration or sequence of operations.

Solutions are disclosed that enable user equipment (UE) self-initiated verification of the presence of a subscriber identity module (SIM) at the location that is represented by the purported owner, without requiring that the SIM be removed from the UE. Examples, using an IP address of a verification website, transmit, by a UE, to the verification website, an identifier (ID) associated with the UE; determine, by the verification website, whether the identifier associated with the UE matches a stored identifier in a SIM address list; based on at least determining that the identifier associated with the UE matches the stored identifier in the SIM address list, determine a UE identification using the SIM address list; embed an interaction ID into a scannable code, the interaction ID comprising a session ID, a customer ID or the UE identification, and a time indicator; transmit, by the verification website, to the UE, the interaction ID or the scannable code; display, by the UE, the scannable code; scan, by a terminal in a retail facility, the scannable code; extract, by the terminal, from the interaction ID, the session ID, the customer ID or the UE identification, and the time indicator; and based on at least determining that the session ID is not expired, using the time indicator: display, by the terminal, a verification success message; or perform a user account change on a user account associated with the UE.

BRIEF DESCRIPTION OF THE DRAWINGS

The disclosed examples are described below with reference to the accompanying drawing figures listed below, wherein.

Figure 1:
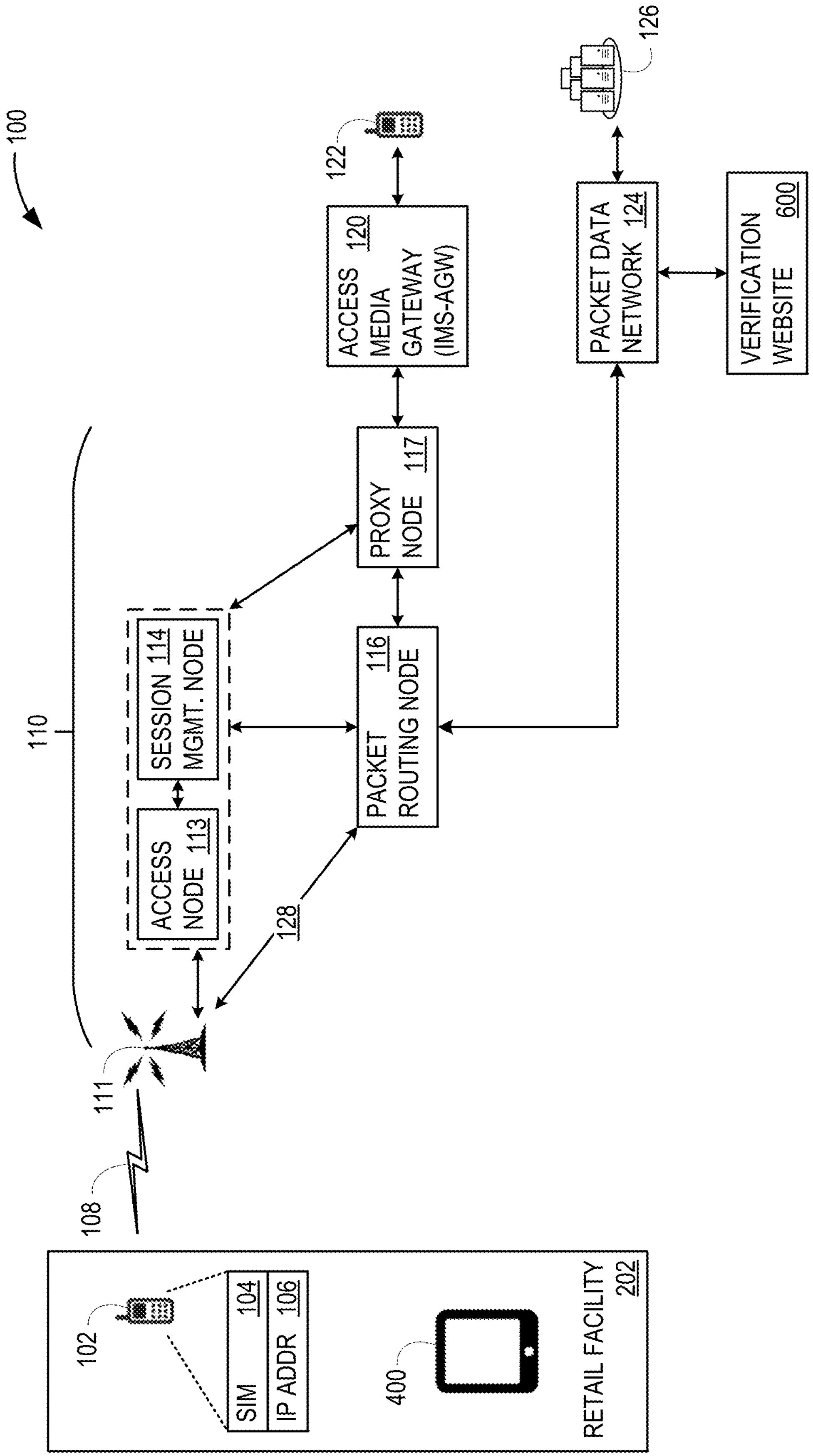
FIG. 1 illustrates an exemplary architecture that advantageously enables user equipment (UE) self-initiated verification of the presence of a subscriber identity module (SIM) at the location that is represented by the purported owner, without requiring that the SIM be removed from the UE.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Verification of a subscriber identity module (SIM), as represented by the purported owner, is enabled without requiring that the SIM be removed from a user equipment (UE, e.g., a cellphone), in a UE self-initiated process. The UE scans a code (e.g., a QR code posted in a retail facility) that contains an address of a verification website, or opens an app that links to the verification website. When the UE visits the verification website, it sends its IP address (using standard http protocol), and/or the identifier (ID) of a SIM inside the UE. If the verification website determines that the IP address of the UE or the SIM ID has a match in a SIM address list that is maintained by the cellular carrier, and which associates SIM IP address and IDs (e.g., integrated circuit card identifiers, ICCIDs), the verification website provides the UE with a time-sensitive scannable code (e.g., a QR code), which indicates that the UE SIM has been verified. A terminal in the retail facility, used by an employee of the wireless carrier scans the code and is able to determine that the UE does actually contain the SIM that is associated with a particular user account.

Aspects of the disclosure improve the performance of cellular networks by enabling trust in a purported cellular service account owner, in a relatively easy manner, such as without requiring removal of a SIM from a UE. The approaches taught herein are more resistant to cyber attacks than the traditional one time PIN security solution. These advantageous results are accomplished, at least in part, by determining, by a verification website, whether the IP address of a UE matches a stored IP address in a SIM address list or whether the identifier of the first SIM matches a stored SIM ID in the SIM address list; generating an interaction ID comprising a session ID, a customer ID or the UE identification, and a time indicator; and based on at least determining that the session ID is not expired, using the time indicator: displaying, by the terminal, a verification success message; or performing a user account change or a user account associated with the UE.

With reference now to the figures, FIG. 1 illustrates an exemplary architecture 100 that advantageously enable verification of the presence of a SIM, as is represented by the purported owner, without requiring that the SIM be removed from the UE. A wireless network 110 is illustrated that is serving a UE 102. UE 102 may be an enhanced Mobile Broadband (eMBB) or cellphone, a fixed wireless access (FWA), internet of things (IOT) device, machine-to-machine (M2M) communication device, a personal computer (PC, e.g., desktop, notebook, tablet, etc.) with a cellular modem, or another telecommunication devices capable of using a wireless network. In the scene depicted in FIG. 1, UE 102 is using wireless network 110 for a packet data session to reach a network resource 126 (e.g., a website) across an external packet data network 124 (e.g., the internet). In some scenarios, UE 102 may use wireless network 110 for a phone call with another UE 122. Wireless network 110 may be a cellular network such as a fifth generation (5G) network, a fourth generation (4G) network, or another cellular generation network. In some contexts, 5G is also referred to as new radio (NR), and standalone 5G, which is a full 5G implementation that does not rely on 4G technology for some functionality, may be referred to SA NR.

UE 102 uses an air interface 108 to communicate with a base station 111 of wireless network 110, such that base station 111 is the serving base station for UE 102 (providing the serving cell). In some scenarios, base station 111 may be referred to as a radio access network (RAN). Wireless network 110 has an access node 113, a session management node 114, and other components (not shown). Wireless network 110 also has a packet routing node 116 and a proxy node 117. Access node 113 and session management node 114 are within a control plane of wireless network 110, and packet routing node 116 is within a data plane (a.k.a. user plane) of wireless network 110.

Base station 111 is in communication with access node 113 and packet routing node 116. Access node 113 is in communication with session management node 114, which is in communication with packet routing node 116 and proxy node 117. Packet routing node 116 is in communication with proxy node 117 and packet data network 124. In some 5G examples, base station 111 comprises a gNodeB (gNB), access node 113 comprises an access mobility function (AMF), session management node 114 comprises a session management function (SMF), and packet routing node 116 comprises a user plane function (UPF).

In some 4G examples, base station 111 comprises an eNodeB (eNB), access node 113 comprises a mobility management entity (MME), session management node 114 comprises a system architecture evolution gateway (SAEGW) control plane (SAEGW-C), and packet routing node 116 comprises an SAEGW-user plane (SAEGW-U). In some examples, proxy node 117 comprises a proxy call session control function (P-CSCF) in both 4G and 5G.

In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations. For example, wireless network 110 may use both a gNB and an eNB co-located at a common cell site. In some examples, multiple cells may be co-located at a common cell site, and may be a mix of 5G and 4G.

Proxy node 117 is in communication with an internet protocol (IP) multimedia system (IMS) access gateway (IMS-AGW) 120 within an IMS, in order to provide connectivity to other wireless (cellular) networks, such as for a call with a UE 122 or a public switched telephone system (PSTN, also known as plain old telephone system, POTS). In some examples, proxy node 117 may be considered to be within the IMS. UE 102 reaches network resource 126 using packet data network 124 (or the IMS, in some examples). Data packets of data traffic 128 to/from UE 102 pass through at least base station 111 and packet routing node 116 on their way from/to packet data network 124 or IMS-AGW 120 (via proxy node 117).

In a verification scenario, illustrated in further detail in FIG. 2 and described more fully below, in relation to the other figures, UE 102 has a SIM 104 and is assigned an IP address 106. UE 102 is within a retail facility 202. An employee of the cellular service provider, that operates wireless network 110, is using a terminal 400, as an employee device, within retail facility 202. Alternatively, the customer visiting retail facility 202 (the purported owner of UE 102) uses terminal 400 as a self-service kiosk.

Terminal 400 may be, for example, a tablet computer or any other suitable for receiving a proximity-based message 226 (see FIG. 2) such as a point of sale computer or self-service kiosk. A verification website 600 provides verification functionality so that the employee of the cellular service provider, located in retail facility 202, is able to trust that the purported owner of UE 102 has actually brought UE 102 with SIM 104 into retail facility 202. This is a proxy for trusting that the purported owner of UE 102 is actually the cellular service account holder 502 (see FIG. 5). Terminal 400 reaches verification website 600 by any practical means, WiFi, cellular, or even a wired connection.

Although FIG. 1 and some of the following figures are described using an example of a cellular network, it should be understood that the teachings herein are applicable to other types of wireless networks. To benefit from the teachings herein, another service provider, beyond a cellular service provider, that manages accounts for its customers should have usage privileges for verification website 600, or otherwise have access to a SIM address list 210 (described below, in relation to FIG. 2). With such privilege or data access, another type of service provider, other than a cellular network, may also benefit from the disclosure herein.

Figure 2:
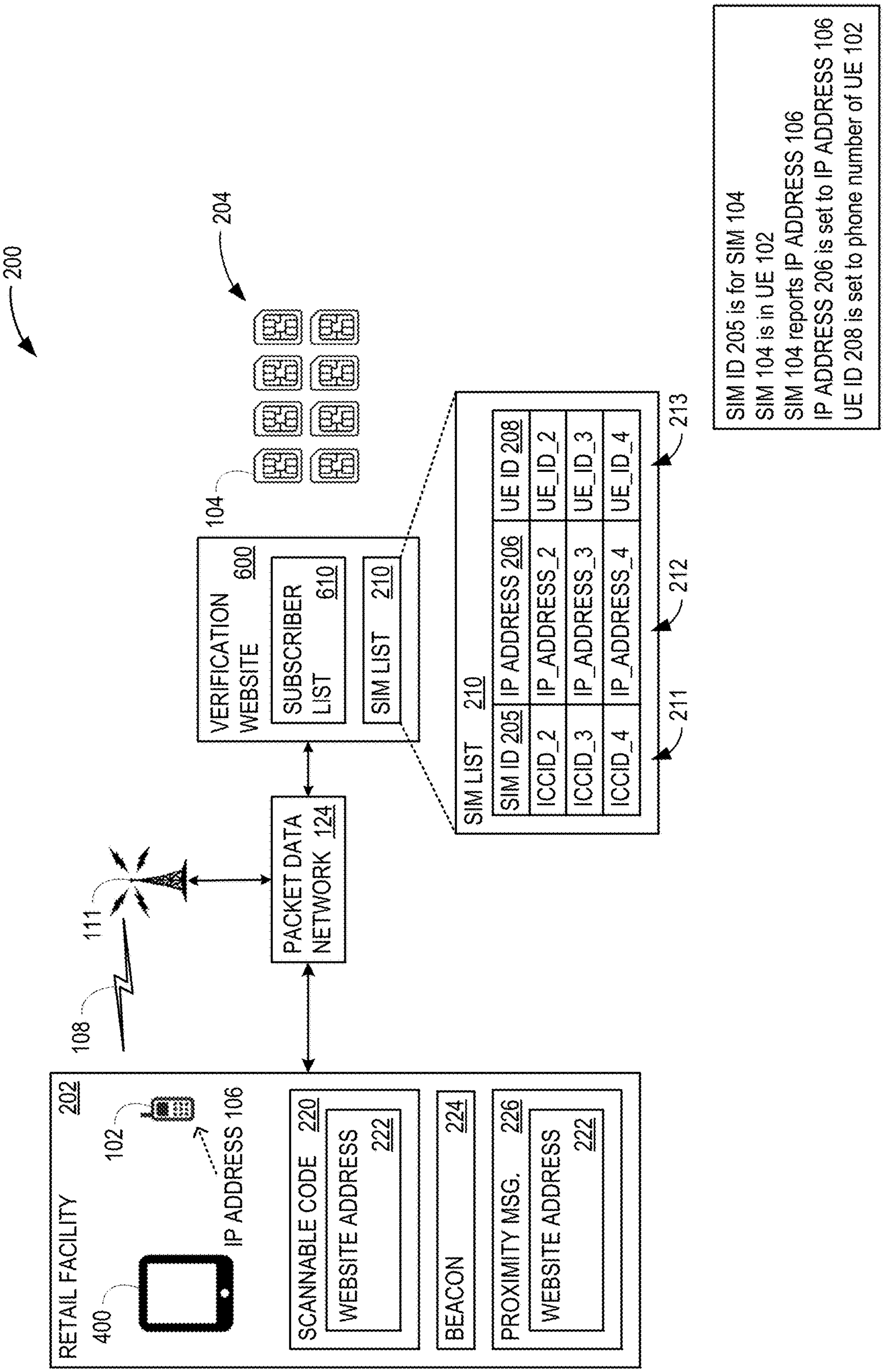
FIG. 2 illustrates an exemplary verification scenario, as may be used in examples of the architecture of FIG. 1.

FIG. 2 illustrates an exemplary verification scenario 200. The cellular service provider provisions a plurality of SIMs 204 for its customers, such as by loading them with unique IP addresses, and generating SIM address list 210. The SIMS of plurality of SIMs 204 may each be a physical SIM card (pSIM) or an embedded SIM (eSIM). SIM address list 210 is shown in the form of a table with three columns: stored SIM identifiers (IDs) 211 that each uniquely reference a SIM, stored IP addresses 212 (at least one per SIM), and stored UE identifications 213 (at least one per UE).

In some examples, each of SIM IDs 211 comprises an integrated circuit card identifier (ICCID). In some scenarios, the IP addresses assigned to plurality of SIMs 204 are rotated, although remain unique. IP address rotation is a process in which the IP address of a device (i.e., its unique identifier on an IP network) changes at scheduled intervals, after a certain amount of requests, or on some other trigger event. Stored UE identifications 213 may be phone numbers, in some examples.

Each row of SIM address list 210 is unique to a SIM, as shown. SIM 104 is represented within SIM address list 210 by a stored SIM ID 205, which is associated with a stored IP address 206 and a stored UE identification 208. Stored IP address 206 is set to the same value as IP address 106, and stored UE identification 208 is set to the phone number (or some other suitable identification) of UE 102. A copy of SIM address list 210 is either stored at or otherwise accessible by verification website 600, which located across packet data network 124 from retail facility 202. In some examples, verification website 600 is another example of network resource 126 of FIG. 1, and packet data network 124 is an example of external network 860 of FIG. 9. Verification website 600 also has a subscriber list, which is shown in further detail in FIG. 6.

UE 102 is brought into retail facility 202 so that the owner of UE 102, who is the cellular service account holder 502 for the cellular plan that defines the service for UE 102, is able to make account changes. The account changes may be adding a new line, removing a line, changing a data plan, or another change. An employee of the cellular service provider, who is using terminal 400 the needs to verify that the person entering retail facility 202 is truly the cellular service account owner (or another person who is on the account and authorized to make changes to the account).

Figure 4:
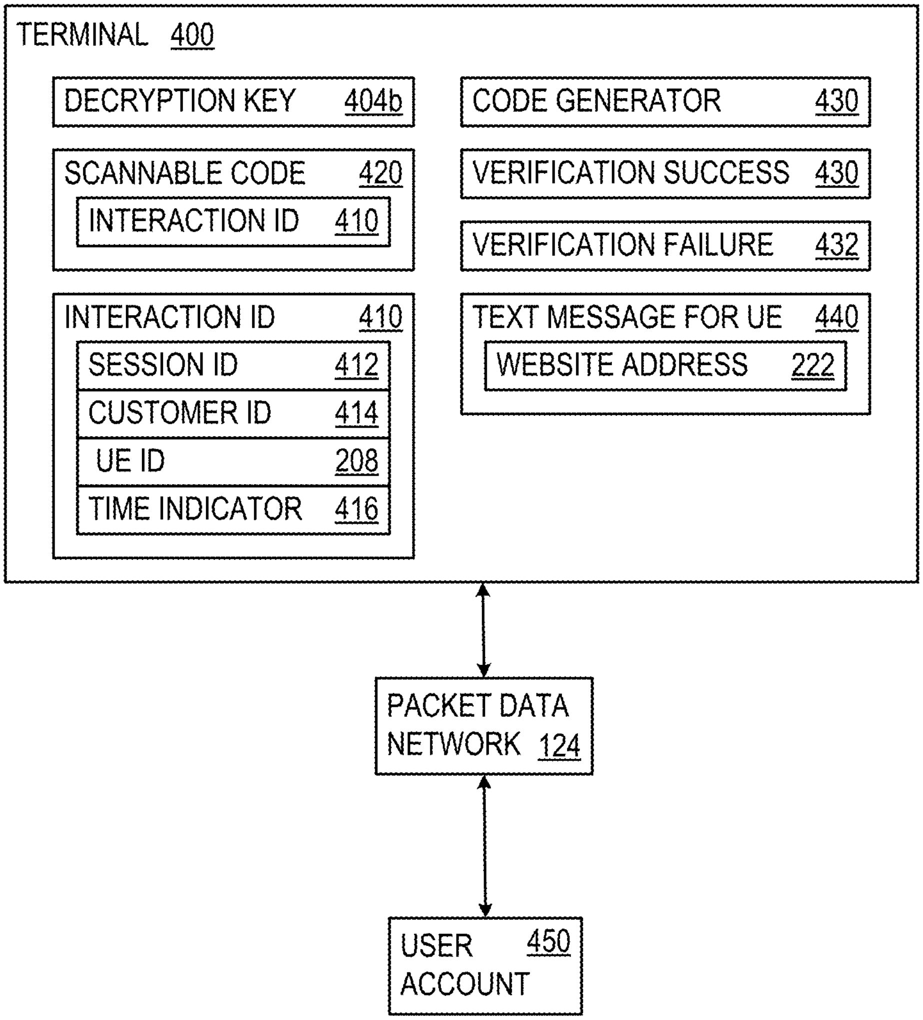
FIG. 4 illustrates further detail for a terminal used for verification in examples of the architecture of FIG. 1.
Figure 5:
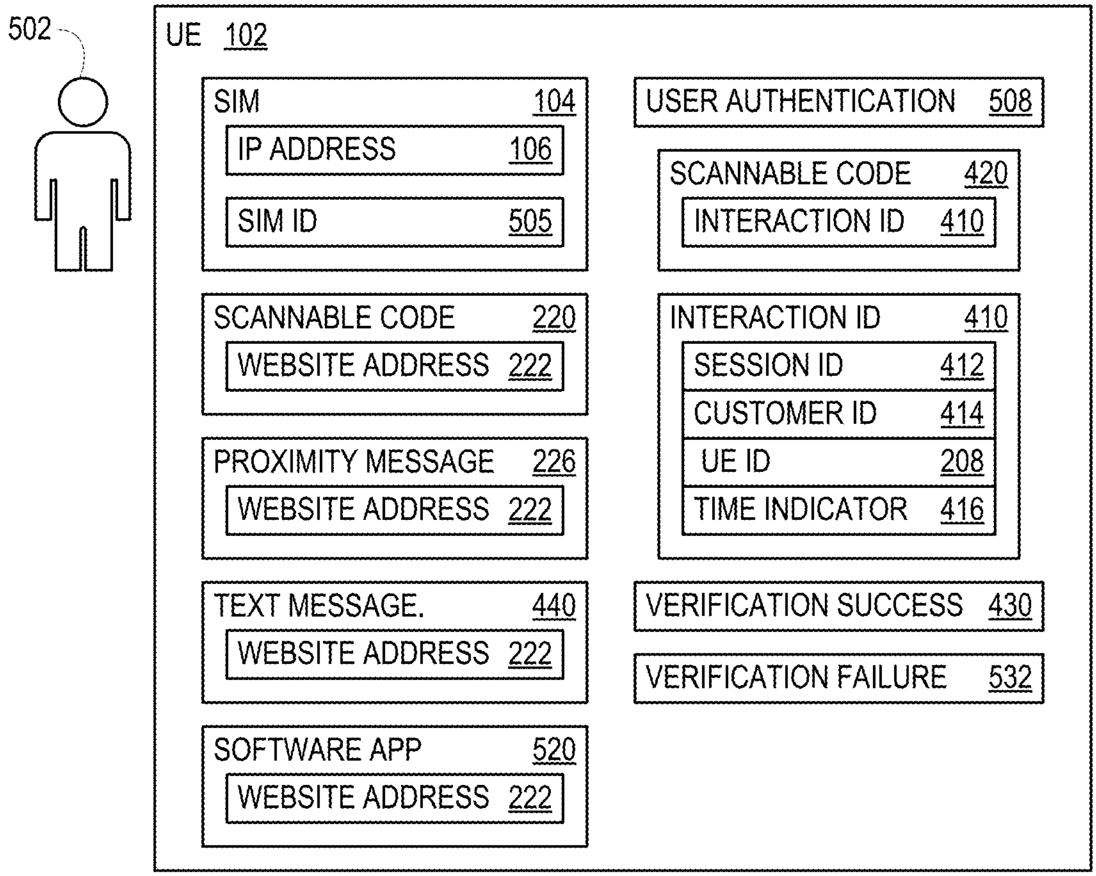
FIG. 5 illustrates further detail for the UE of FIG. 1.

Retail facility 202 may provide a scannable code 220, such as a QR code or 2D barcode for UE 102 to scan, in order to obtain the IP address 222 of verification website 600. Alternatively, there may be a short range wireless beacon 224, such as Bluetooth or WiFi or near field communication (NFC), that transmits proximity-based message 226 that contains IP address 222 of verification website 600, and which UE is able to receive when within retail facility 202. Other alternatives for UE to obtain IP address 222 include a software app 520 on UE 102 (e.g., installed on UE 102 by the wireless service provider) and which is shown in FIG. 5, and a text message 440 sent by terminal 400 (or some other source) to UE 102 and which is shown in FIGS. 4 and 5. UE 102 visits verification website 600 to perform the verification process.

Figure 3:
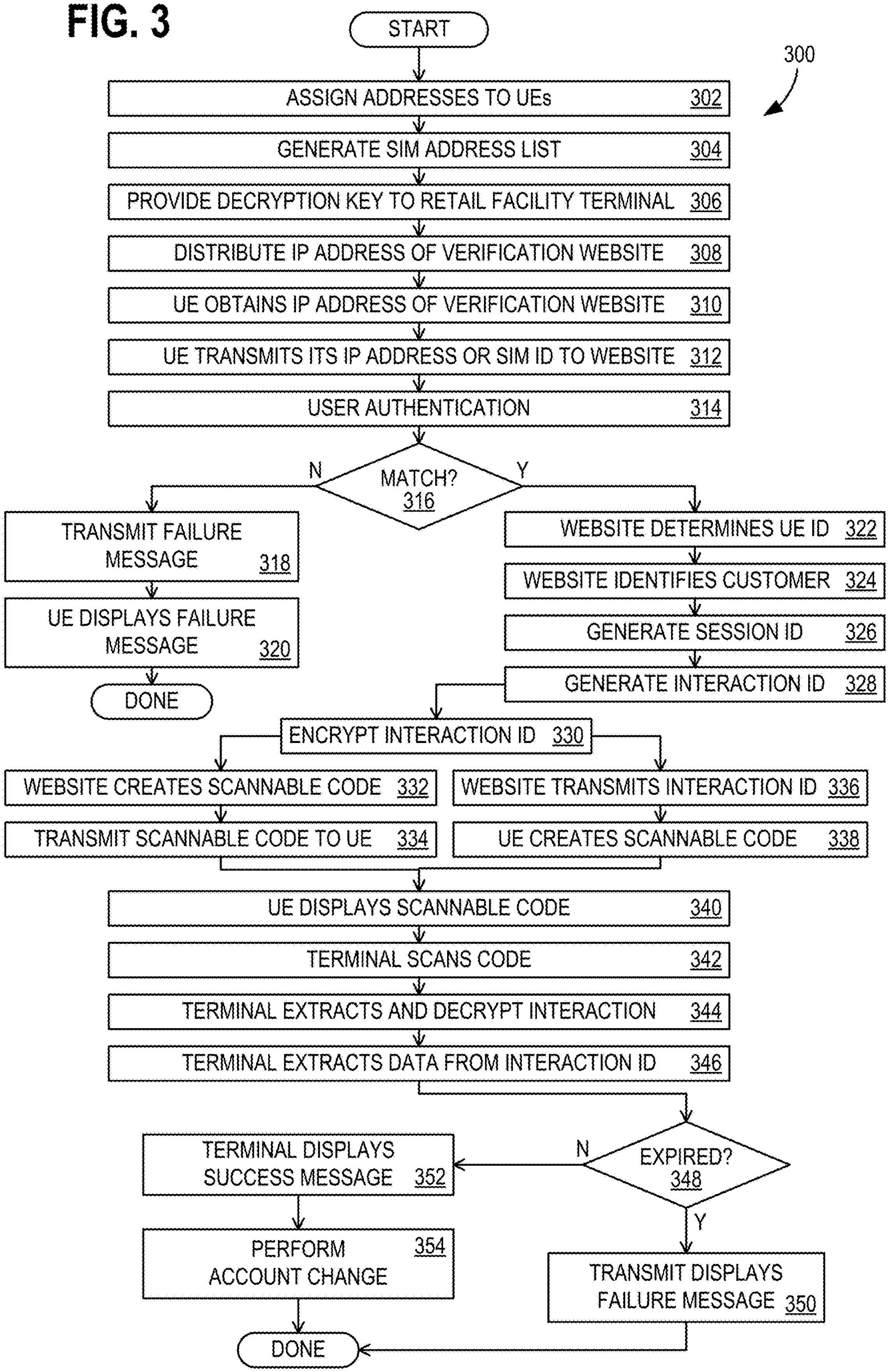
FIG. 3 illustrates a flowchart of exemplary operations associated with the architecture of FIG. 1.
Figure 6:
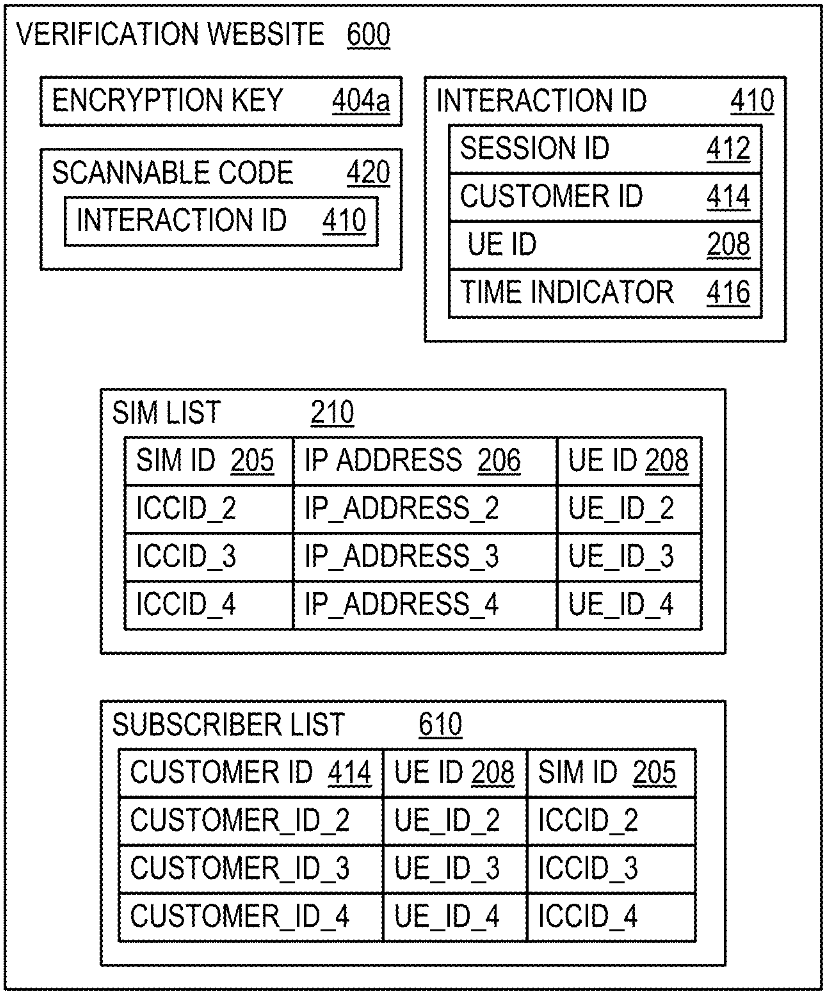
FIG. 6 illustrates further detail for a remote website used for verification in examples of the architecture of FIG. 1.

In order to perform the verification, the processes described in relation to flowchart 300 of FIG. 3 is performed. In some examples, at least a portion of flowchart 300 may be performed using one or more computing devices 800 of FIG. 8. FIGS. 4, 5, and 6 illustrates further detail for terminal 400, UE 102, and verification website 600, respectively. As FIG. 3 is described, references are made to the details illustrated in one or more of FIGS. 4, 5, and 6 for a respective one of terminal 400, UE 102, and verification website 600.

Flowchart 300 commences with assigning unique IP addresses to UEs, including assigning IP address 106 to UE 102, which then associates IP address 106 with SIM 104, in operation 302. Operation 304 generates SIM address list 210 which associates stored SIM IDs with both stored IP addresses and stored UE identifications for each SIM of plurality of SIMs 204. In operation 306, a decryption key **404*b* is transmitted (or otherwise provided) to terminal 400, and is shown in FIG. 4**.

Operation 308 distributes IP address 222 of verification website 600, such as by posting scannable code 220 in retail facility 202, terminal 400 transmitting text message 440 to UE 102 (see FIGS. 4 and 5), transmitting proximity-based message 226 to UE 102 using short range wireless beacon 224, and/or installing a software app 520 onto UE 102. In operation 310, UE 102 obtains IP address 222 of verification website 600 by scanning scannable code 220, receiving text message 440 or proximity-based message 226, or opening software app 520, as shown in FIG. 5.

Because UE 102 has SIM 104, UE 102 uses IP address 106 as its IP address when visiting websites, and is also able to use extensible authentication protocol authentication and key agreement (EAP-AKA) protocol to extract and share identifier 505 of SIM 104. See FIG. 5. Identifier 505 matches stored SIM ID 205 in SIM address list 210. In operation 312, UE 102 transmits its IP address (which is IP address 106 if UE 102 is using cellular data) or identifier 505 of SIM 104 to verification website 600, using IP address 222. In operation 314, verification website 600 or software app 520 requests user authentication 508. If software app 520 requests user authentication 508, operation 314 may occur prior to operation 312. UE 102 receives user authentication 508, as shown in FIG. 5, and in some examples, transmits user authentication 508 to verification website 600.

Verification website 600 determines whether IP address 106 of UE 102 matches stored IP address 206 in SIM address list 210 or whether identifier 505 of SIM 104 matches stored SIM ID 205 in SIM address list 210, in decision operation 316. In some examples, this is dependent upon verification website 600 receiving user authentication 508 from UE 102. If there is no match, in operation 318, verification website 600 transmits verification failure message 532 to UE 102, using the IP address provided in operation 312. Verification failure message 532 may indicate a notice to turn off WiFi and/or to turn on cellular data, because if UE 102 is using a WiFi router, the IP address provided in operation 312 may have been the IP address of the WiFi router, rather than IP address 106 of UE 102. In operation 320, UE 102 displays verification failure message 532, shown in FIG. 5. Flowchart 300 then terminates.

If, however, in decision operation 316, verification website 600 determines that IP address 106 of UE 102 matches stored IP address 206 or identifier 505 of SIM 104 matches stored SIM ID 205, verification website 600 determines UE identification 208 using SIM address list 210, in operation 322. This is possible because SIM address list 210 associates stored IP address 206 and stored SIM ID 205 with UE identification 208. See FIG. 6. In some examples, verification website 600 determines a customer ID 414 using a subscriber list 610 that associates UE identification 208 (and possibly also stored SIM ID 205) with customer ID 414, in operation 324, as shown in FIG. 6. Customer ID 414 comprises an identification of an account holder 502 (shown in FIG. 5), who is associated with UE 102, such as the owner of UE 102.

In operation 326, verification website 600 generates a session ID 412 that identifies the customer interaction session in which account holder 502 is attempting to make changes to their user account 450 (shown in FIG. 4). Verification website 600 may store session ID 412 associated with user authentication 508 and IP address 106 and/or identifier 505 of SIM 104. Verification website 600 generates an interaction ID 410 in operation 328, which includes session ID 412, customer ID 414 and/or UE identification 208, and a time indicator 416, as shown in FIG. 6. Time indicator 416 is used to determine when session ID 412 expires, and may take the form of the current time and date or a session expiration time and date. Verification website 600 encrypts interaction ID 410, in operation 330, using an encryption key **404*a*, also shown in FIG. 6. In some examples, encryption key 404*a* and decryption key 404*b*** are a common symmetric encryption key or are each part of a common key pair.

In some scenarios, flowchart 300 performs operations 332 and 334, in which verification website 600 embeds (encrypted) interaction ID 410 into a scannable code 420 (operation 332) and transmits scannable code 420 to UE 102 (operation 334). In some scenarios, flowchart 300 performs operations 336 and 338, in which verification website 600 transmits (encrypted) interaction ID 410 to UE 102 (operation 336) and UE 102 embeds interaction ID 410 into scannable code 420 (operation 338). Scannable code 420 may be a QR code or a 2D barcode. See FIGS. 5 and 6. UE 102 displays scannable code 420 in operation 340.

Terminal 400 scans scannable code 420 in retail facility 202, in operation 342, and decrypts interaction ID 410 using decryption key 404*b* in operation 344. Terminal 400 then extracts session ID 412, customer ID 414 and/or UE identification 208, and time indicator from interaction ID 410, in operation 346. See FIG. 4. In decision operation 348, terminal 400 uses time indicator 416 to determine whether session ID 412 is expired. If session ID 412 is expired, terminal 400 displays a verification failure message 432, indicating that session ID 412 is expired, in operation 350, and flowchart 300 terminates. See FIG. 4.

Otherwise, if session ID 412 is not expired, terminal 400 displays a verification success message 430, shown in FIG. 4, in operation 352, which indicates that UE 102 passed a SIM verification. In some examples, a version of verification success message 430 is also displayed on UE 102. See FIG. 5. In operation 354, terminal 400 is used to perform a user account change on user account 450 associated with UE 102, shown in FIG. 4.

Figure 7:
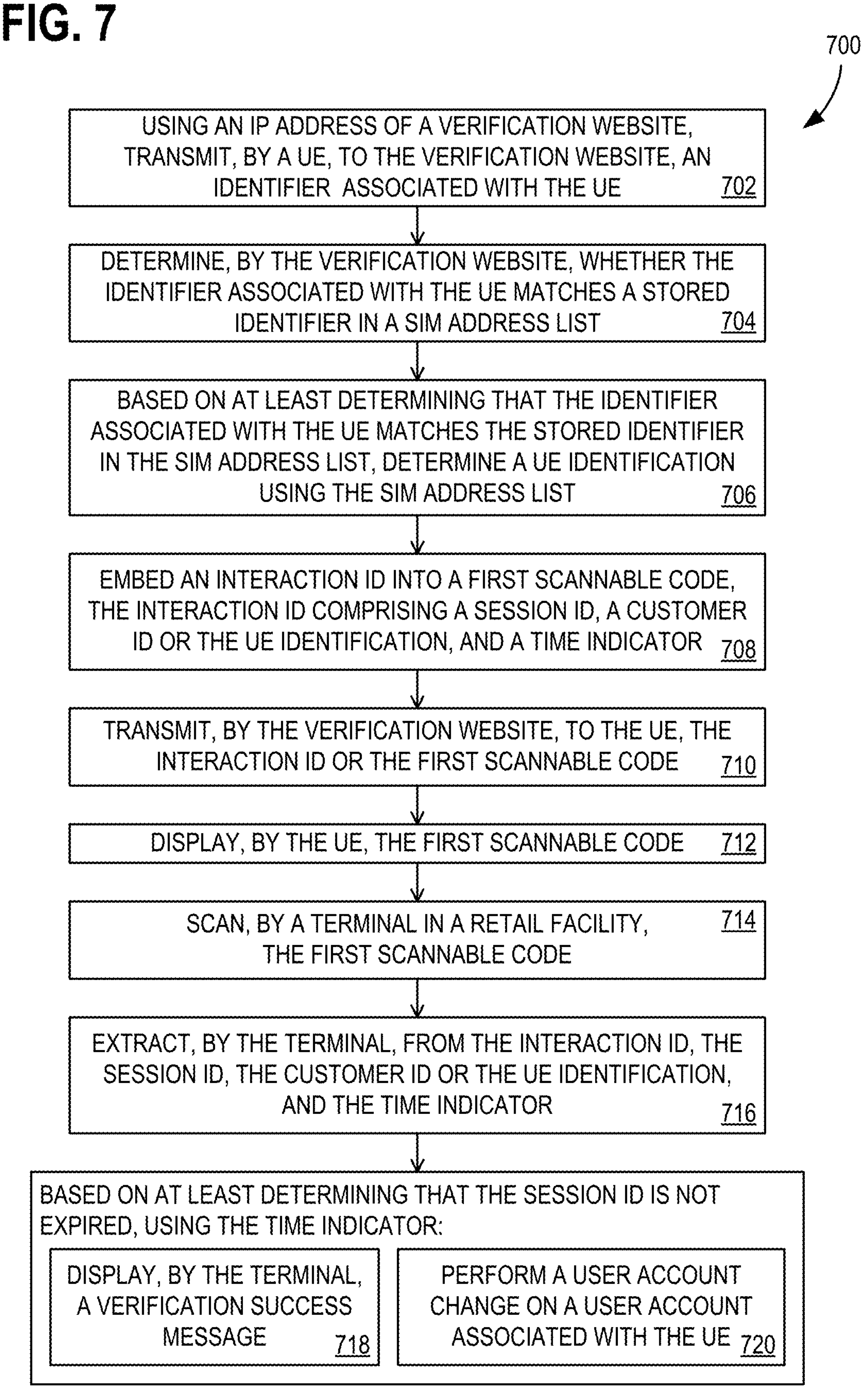
FIG. 7 illustrates a flowchart of exemplary operations associated with the architecture of FIG. 1.

FIG. 7 illustrates a flowchart 700 of exemplary operations associated with architecture 100. In some examples, at least a portion of flowchart 700 may be performed using one or more computing devices 800 of FIG. 8. Flowchart 700 commences with operation 702, which includes, using an IP address of a verification website, transmitting, by a UE, to the verification website, an identifier associated with the UE. Operation 704 includes determining, by the verification website, whether the identifier associated with the UE matches a stored identifier in a SIM address list.

Operation 706 includes, based on at least determining that the identifier associated with the UE matches the stored identifier in the SIM address list, determining a UE identification using the SIM address list. Operation 708 includes embedding an interaction ID into a scannable code, the interaction ID comprising a session ID, a customer ID or the UE identification, and a time indicator. Operation 710 includes transmitting, by the verification website, to the UE, the interaction ID or the scannable code. Operation 712 includes displaying, by the UE, the scannable code.

Operation 714 includes scanning, by a terminal in a retail facility, the scannable code. Operation 716 includes extracting, by the terminal, from the interaction ID, the session ID, the customer ID or the UE identification, and the time indicator. Operations 718 and 720 are both based on at least determining that the session ID is not expired, using the time indicator, and one or both may be performed. Operation 718 includes displaying, by the terminal, a verification success message, and operation 720 includes performing a user account change on a user account associated with the UE.

Figure 8:
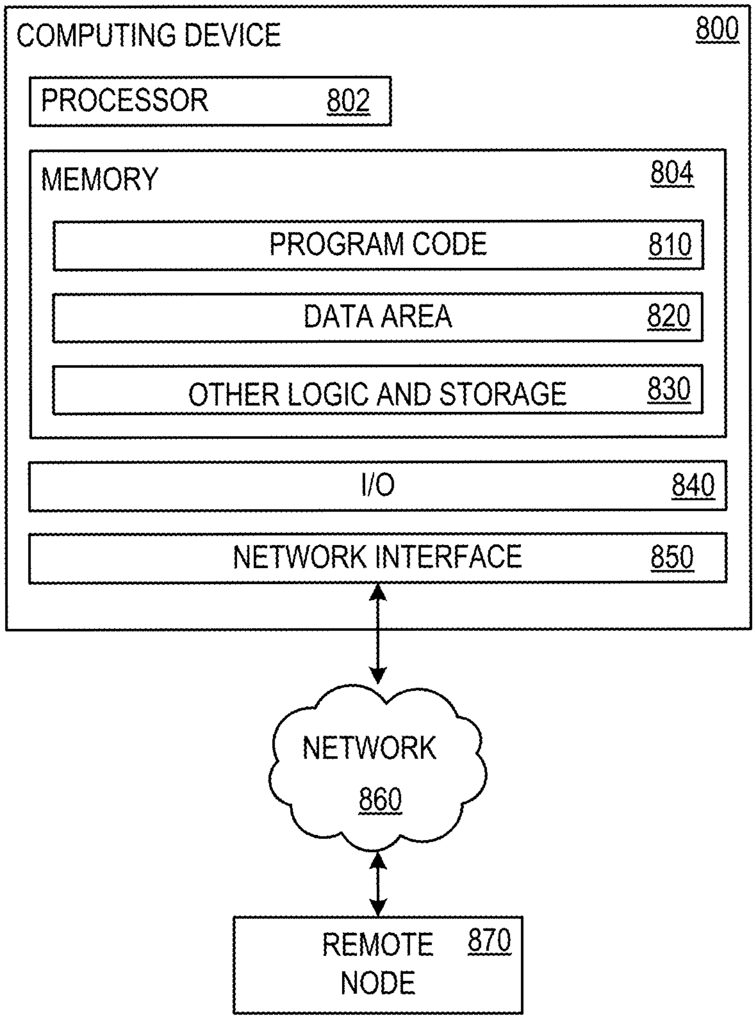
FIG. 8 illustrates a block diagram of a computing device suitable for implementing various aspects of the disclosure.

FIG. 8 illustrates a block diagram of computing device 800 that may be used as any component described herein that may require computational or storage capacity. Computing device 800 has at least a processor 802 and a memory 804 that holds program code 810, data area 820, and other logic and storage 830. Memory 804 is any device allowing information, such as computer executable instructions and/or other data, to be stored and retrieved. For example, memory 804 may include one or more random access memory (RAM) modules, flash memory modules, hard disks, solid-state disks, persistent memory devices, and/or optical disks. Program code 810 comprises computer executable instructions and computer executable components including instructions used to perform operations described herein. Data area 820 holds data used to perform operations described herein. Memory 804 also includes other logic and storage 830 that performs or facilitates other functions disclosed herein or otherwise required of computing device 800. An input/output (I/O) component 840 facilitates receiving input from users and other devices and generating displays for users and outputs for other devices. A network interface 850 permits communication over external network 860 with a remote node 870, which may represent another implementation of computing device 800. For example, a remote node 870 may represent another of the above-noted nodes within architecture 100.

ADDITIONAL EXAMPLES

An example system comprises: a processor; and a computer-readable medium storing instructions that are operative upon execution by the processor to: using an IP address of a verification website, transmit, by a UE, to the verification website, an identifier associated with the UE; determine, by the verification website, whether the identifier associated with the UE matches a stored identifier in a SIM address list; based on at least determining that the identifier associated with the UE matches the stored identifier in the SIM address list, determine a UE identification using the SIM address list; embed an interaction ID into a first scannable code, the interaction ID comprising a session ID, a customer ID or the UE identification, and a time indicator; transmit, by the verification website, to the UE, the interaction ID or the first scannable code; display, by the UE, the first scannable code; scan, by a terminal in a retail facility, the first scannable code; extract, by the terminal, from the interaction ID, the session ID, the customer ID or the UE identification, and the time indicator; and based on at least determining that the session ID is not expired, using the time indicator: display, by the terminal, a verification success message; or perform a user account change on a user account associated with the UE.

An example method comprises: using an IP address of a verification website, transmitting, by a UE, to the verification website, an identifier associated with the UE; determining, by the verification website, whether the identifier associated with the UE matches a stored identifier in a SIM address list; based on at least determining that the identifier associated with the UE matches the stored identifier in the SIM address list, determining a UE identification using the SIM address list; embedding an interaction ID into a first scannable code, the interaction ID comprising a session ID, a customer ID or the UE identification, and a time indicator; transmitting, by the verification website, to the UE, the interaction ID or the first scannable code; displaying, by the UE, the first scannable code; scanning, by a terminal in a retail facility, the first scannable code; extracting, by the terminal, from the interaction ID, the session ID, the customer ID or the UE identification, and the time indicator; and based on at least determining that the session ID is not expired, using the time indicator: displaying, by the terminal, a verification success message; or performing a user account change on a user account associated with the UE.

One or more example computer storage devices has computer-executable instructions stored thereon, which, upon execution by a computer, cause the computer to perform operations comprising: using an IP address of a verification website, transmitting, by a UE, to the verification website, an identifier associated with the UE; determining, by the verification website, whether the identifier associated with the UE matches a stored identifier in a SIM address list; based on at least determining that the identifier associated with the UE matches the stored identifier in the SIM address list, determining a UE identification using the SIM address list; embedding an interaction ID into a first scannable code, the interaction ID comprising a session ID, a customer ID or the UE identification, and a time indicator; transmitting, by the verification website, to the UE, the interaction ID or the first scannable code; displaying, by the UE, the first scannable code; scanning, by a terminal in a retail facility, the first scannable code; extracting, by the terminal, from the interaction ID, the session ID, the customer ID or the UE identification, and the time indicator; and based on at least determining that the session ID is not expired, using the time indicator: displaying, by the terminal, a verification success message; or performing a user account change on a user account associated with the UE.

Alternatively, or in addition to the other examples described herein, examples include any combination of the following:

- the wireless network comprises a cellular network;
- the UE comprises an eMBB or cellular telephone, or an FWA;
- each stored IP address is unique;
- generating the SIM address list associating, for each SIM of the plurality of SIMs, the stored IP address with a stored UE identification, wherein the UE identification comprises a phone number of the UE;
- the identifier associated with the UE comprises an IP address of the UE or an identifier of a first SIM of the UE;
- the stored identifier in the SIM address list comprises a stored IP address in the SIM address list or a stored SIM ID in the SIM address list;
- the verification website embeds the interaction ID into the first scannable code and the verification website transmits the first scannable code to the UE;
- the verification website transmits the interaction ID to the UE and the UE embeds the interaction ID into the first scannable code;
- using the time indicator, determining whether the session ID is expired;
- based on at least determining that the session ID is expired, displaying, by the terminal, a verification failure message;
- transmitting a decryption key to the terminal;
- encrypting the interaction ID using an encryption key;
- embedding the interaction ID into the first scannable code comprises embedding the encrypted interaction ID into the first scannable code;
- decrypting the interaction ID using the decryption key;
- the encryption key and the decryption key are a common symmetric encryption key or are each part of a common key pair;
- receiving user authentication by the UE;
- transmitting, by the UE, to the verification website, the user authentication;
- determining whether the IP address of the UE matches the stored IP address in the SIM address list is based on at least the verification website receiving user authentication from the UE;
- determining the customer ID using the UE identification and a subscriber list;
- the customer ID comprises an identification of an account holder associated with the UE;
- the SIM address list includes an ICCID for each SIM of the plurality of SIMs;
- the identifier of the first SIM comprises an ICCID;
- the verification website determines the UE identification;
- the verification website generates the session ID;
- associating the session ID with the user authentication and either the IP address of the UE and/or the identifier of the first SIM;
- the verification website generates the interaction ID;
- the verification website encrypts the interaction ID;
- the time indicator comprises a current time and date;
- the time indicator comprises a session expiration time and date;
- the first scannable code comprises a QR code or a 2D barcode;
- the verification success message indicates that the UE passed a SIM verification;
- the terminal determines whether the session ID is expired;
- the verification failure message indicates that the session ID is expired;
- the verification website determines the customer ID;
- the terminal decrypts the interaction ID;
- the verification website requests the user authentication from the UE;
- distributing the IP address of the verification website;
- distributing the IP address of the verification website comprises posting the second scannable code in the retail facility;
- the second scannable code comprises QR code or a 2D barcode;
- distributing the IP address of the verification website comprises transmitting the text message to the UE;
- the text message contains the IP address of the verification website;
- the text message comprises an SMS message or an MMS message;
- distributing the IP address of the verification website comprises transmitting the proximity-based message to the UE;
- the proximity-based message contains the IP address of the verification website and is based on at least proximity of the UE to the retail facility;
- the proximity-based message comprises a message from a short range wireless beacon;
- distributing the IP address of the verification website comprises installing a software app onto the UE;
- the software app contains the IP address of the verification website;
- scanning, by the UE, the second scannable code;
- receiving, by the UE, the text message or the proximity-based message;
- opening the software app on the UE;
- based on at least determining that the IP address of the UE does not match a stored IP address in the SIM address list, transmitting, by the verification website, to the UE, using the IP address of the UE, the first no verification message;
- the first no verification message indicates a notice to turn off WiFi and/or to turn on cellular data; and displaying, by the UE, the first no verification message.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:

displaying, at a retail facility of a cellular service provider, a first scannable code to a user equipment (UE);

receiving, by a verification website operated by the cellular service provider, a message from the UE in response to the UE scanning the first scannable code displayed by a terminal, the message including an identifier (ID) comprising an IP address assigned to an integrated circuit card ID (ICCID) or subscriber identity module (SIM) of the UE by the cellular service provider;

verifying, by the verification website, that the IP address carried by the message matches a stored IP address in a SIM address list maintained by the cellular service provider;

embedding, by the verification website, an interaction ID into a second scannable code in response to verifying that the IP address carried by the message matches the stored IP address in the SIM address list, the embedded interaction ID comprising a session ID, a customer ID or UE ID, and a time indicator;

transmitting, by the verification website, the second scannable code to the UE, wherein the second scannable code is displayed by the UE to the terminal upon reception;

scanning, by the terminal in a retail facility, the second scannable code displayed by the UE; and displaying, by the terminal in response to scanning the second scannable code, a verification success message indicating that the identity of the UE has been verified on-site at the retail facility.

2. The method of claim 1, wherein the first scannable code is a QR code.

3. The method of claim 2, wherein the second scannable code is a QR code.

4. The method of claim 2, wherein the second scannable code is a two dimensional (2D) bar code.

5. The method of claim 1, wherein the UE displays the embedded the interaction ID when displaying the second scannable code.

6. The method of claim 5, wherein the terminal determines that an interactive session remains active or has otherwise not yet expired based on the interaction ID embedded within the second scannable code as displayed by the UE.

7. The method of claim 1, wherein an interaction ID is embedded into the second scannable code by the verification website prior to the UE receiving the second scannable code from the verification website.

8. The method of claim 7, wherein the terminal determines that an interactive session remains active or has otherwise not yet expired based on the interaction ID embedded within the second scannable code displayed by the UE.

9. A system comprising:

a processor; and a memory storing programming instructions for execution by the processor, the programming instructions, upon execution by the processor, causing the system to perform the following operations:

displaying, at a retail facility of a cellular service provider, a first scannable code to a user equipment (UE);

receiving, by a verification website operated by the cellular service provider, a message from the UE in response to the UE scanning the first scannable code displayed by a terminal, the message including an identifier (ID) comprising an IP address assigned to an integrated circuit card ID (ICCID) or subscriber identity module (SIM) of the UE by the cellular service provider;

verifying, by the verification website, that the IP address carried by the message matches a stored IP address in a SIM address list maintained by the cellular service provider;

embedding, by the verification website, an interaction ID into a second scannable code in response to verifying that the IP address carried by the message matches the stored IP address in the SIM address list, the embedded interaction ID comprising a session ID, a customer ID or UE ID, and a time indicator;

transmitting, by the verification website, the second scannable code to the UE, wherein the second scannable code is displayed by the UE to the terminal upon reception;

scanning, by the terminal, the second scannable code displayed by the UE; and displaying, by the terminal in response to scanning the second scannable code, a verification success message indicating that the identity of the UE has been verified on-site at the retail facility.

10. The system of claim 9, wherein the first scannable code is a QR code.

11. The system of claim 10, wherein the second scannable code is a QR code.

12. The system of claim 10, wherein the second scannable code is a two dimensional (2D) bar code.

13. The system of claim 9, wherein the UE displays the embedded the interaction ID when displaying the second scannable code.

14. The system of claim 13, wherein the terminal determines that an interactive session remains active or has otherwise not yet expired based on the interaction ID embedded within the second scannable code displayed by the UE.

15. The system of claim 9, wherein an interaction ID is embedded into the second scannable code by the verification website prior to the UE receiving the second scannable code from the verification website.

16. The system of claim 15, wherein the terminal determines that an interactive session remains active or has otherwise not yet expired based on the interaction ID embedded within the second scannable code displayed by the UE.

17. A computer program product storing programming instructions for execution by a processor of a system, the programming instructions, upon execution by the processor, causing the system to perform the following operations:

displaying, at a retail facility of a cellular service provider, a first scannable code to a user equipment (UE);

receiving, by a verification website operated by the cellular service provider, a message from the UE in response to the UE scanning the first scannable code displayed by the terminal, the message including an identifier (ID) comprising an IP address assigned to an integrated circuit card ID (ICCID) or subscriber identity module (SIM) of the UE by the cellular service provider;

verifying, by the verification website, that the IP address carried by the message matches a stored IP address in a SIM address list maintained by the cellular service provider;

embedding, by the verification website, an interaction ID into a second scannable code in response to verifying that the IP address carried by the message matches the stored IP address in the SIM address list, the embedded interaction ID comprising a session ID, a customer ID or UE ID, and a time indicator;

transmitting, by the verification website, the second scannable code to the UE, wherein the second scannable code is displayed by the UE to the terminal upon reception;

scanning, by the terminal, the second scannable code displayed by the UE; and displaying, by the terminal in response to scanning the second scannable code, a verification success message indicating that the identity of the UE has been verified on-site at the retail facility.

* * * * *